United States Patent
Orlowski et al.

(10) Patent No.: US 7,521,827 B2
(45) Date of Patent: Apr. 21, 2009

(54) MOTOR GROUND SEAL

(75) Inventors: David C. Orlowski, Punta Gorda, FL (US); Thomas D. Coe, Milan, IL (US)

(73) Assignee: Isotech of Illinois, Inc., Rock Island, IL (US)

( * ) Notice: Subject to any disclaimer, the term of this patent is extended or adjusted under 35 U.S.C. 154(b) by 433 days.

(21) Appl. No.: 11/378,208

(22) Filed: Mar. 17, 2006

(65) Prior Publication Data

US 2007/0138748 A1    Jun. 21, 2007

Related U.S. Application Data

(60) Provisional application No. 60/693,548, filed on Jun. 25, 2005.

(51) Int. Cl.
*H02K 11/00* (2006.01)
*F16J 15/447* (2006.01)
*H05F 3/02* (2006.01)

(52) U.S. Cl. .................. 310/68 R; 310/72; 361/220; 277/412

(58) Field of Classification Search .............. 310/68 R, 310/72, 88, 91; 361/212, 220–222; 277/378, 277/411, 412, 418–420
See application file for complete search history.

(56) References Cited

U.S. PATENT DOCUMENTS

| | | | | |
|---|---|---|---|---|
| 4,515,417 | A * | 5/1985 | Shiraishi | 384/445 |
| 5,967,524 | A * | 10/1999 | Fedorovich | 277/351 |
| 6,386,546 | B1 * | 5/2002 | Fedorovich | 277/351 |
| 6,419,233 | B2 * | 7/2002 | Orlowski | 277/411 |
| 6,608,410 | B2 | 8/2003 | Sato et al. | |
| 6,670,733 | B2 * | 12/2003 | Melfi | 310/68 R |
| 2001/0017495 | A1 | 8/2001 | Sato et al. | |
| 2002/0121821 | A1 * | 9/2002 | Ritter | 310/71 |
| 2002/0136161 | A1 | 9/2002 | Cleereman et al. | |
| 2003/0057783 | A1 | 3/2003 | Melfi | |
| 2003/0086630 | A1 | 5/2003 | Bramel et al. | |
| 2004/0233592 | A1 * | 11/2004 | Oh et al. | 361/23 |

* cited by examiner

*Primary Examiner*—Tran N Nguyen
(74) *Attorney, Agent, or Firm*—Hamilton IP Law, PC.; Jay R. Hamilton; Charles A. Damschen

(57) ABSTRACT

A shaft seal assembly is disclosed having a stator including a main body and axial and radial projections therefrom. The rotor is radially extended and encompasses the axial and radial projections from said stator. A passageway formed between the radial projection of stator and rotor results in an axial passageway having its opening facing rearwardly from the rotor and away from the source of impinging coolant and/or contaminant. A concentric circumferential receptor groove in the stator facing the housing allows insertion of conductive means for transmission of electrostatic charge away from the shaft through the shaft seal assembly to the housing and ground. The receptor groove is opposite the axial passageway and provides for both a substantially lower contaminant environment and improved engagement with conductive means. The dimension of interface gap between the rotor and the radial projection from the stator, which the access to the shaft of any impinging material is fixed at a predetermined value and does not vary with the relative movement between the rotor and the stator. The shaft seal assembly provides improved rejection or warding off of contaminants from ingress into the labyrinths and ultimately restrains attack of the bearing environment as well as substantial elimination of bearing current and attendant bearing fluting or frosting.

11 Claims, 8 Drawing Sheets

MOTOR GROUND SEAL

CROSS-REFERENCE TO RELATED APPLICATIONS

The present application claims the benefits of U.S. Provisional Application Ser. No. 60/693,548, filed Jun. 25, 2005. Applicant herein claims priority from and incorporates herein by reference in its entirety provisional patent application No. 60/693,548.

FIELD OF THE INVENTION

The present invention relates to an improved bearing isolator sealing device, and more particularly, to a bearing isolator for directing electrostatic charge to ground while retaining lubrication solution and repelling contamination such as water, dust, dirt, sand and paper stock from the bearing environment and away from the shaft grounding ring, within the bearing cavity of a hub assembly such as an electrical motor bearing for engagement with a rotatable shaft.

STATEMENT REGARDING FEDERALLY SPONSORED RESEARCH OR DEVELOPMENT

No federal funds were used to develop or create the invention disclosed and described in the patent application.

BACKGROUND OF THE INVENTION

This invention relates generally to shaft sealing devices for use with rotating equipment. Adequate maintenance of rotating equipment is difficult to obtain because of extreme equipment duty cycles, the lessening of service factors, design and the lack of spare rotating equipment in many processing plants. This is especially true of machine tool spindles, wet end paper machine rolls, aluminum rolling mills and steam quench pumps and other equipment utilizing extreme contamination affecting lubrication. Various forms of shaft sealing devices have been utilized to try to protect the integrity of the bearing environment, including rubber lip seals, clearance labyrinth seals, and attraction magnetic seals. Lip seals or O-ring shaft seals can quickly wear out and fail and are also known to permit excessive amounts of moisture and other contaminants to immigrate into the oil reservoir of the operating equipment even before failure had exposed the interface between the rotor and the stator to the contaminants or lubricants at the radial extremity of the seal. The problem of seal wear and damage as applied to electrical motors using variable frequency drives is compounded because of the very nature of the control of electricity connected to variable frequency drive (hereinafter referred to as VFD) controlled motors.

VFDs regulate the speed of a motor by converting sinusoidal line alternating current (AC) voltage to direct current (DC) voltage, then back to a pulse width modulated (PWM) AC voltage of variable frequency. The switching frequency of these pulses ranges from 1 kHz up to 20 kHz and is referred to as the "carrier frequency." The ratio of change in voltage to the change in time ($\Delta V/\Delta T$) creates what has been described as a parasitic capacitance between the motor stator and the rotor, which induces a voltage on the rotor shaft. If the voltage induced on the shaft, which is referred to as "common mode voltage" or "shaft voltage," builds up to a sufficient level, it can discharge to ground through the bearings.

Current that finds its way to ground through the motor bearings in this manner is called "bearing current."[1]

http://www.greenheck.com/technical/tech_detail.php?display=files/Product-_guide/fa 117_03

There are many causes of bearing current including voltage pulse overshoot in the VFD, non-symmetry of the motor's magnetic circuit, supply unbalances, transient conditions, and others. Any of these conditions can occur independently or simultaneously to create bearing currents.[2]

http://www.greenheck.com/technical/tech_detail.php?display=files/Product-_guide/fa 117_03

Shaft voltage accumulates on the rotor until it exceeds the dielectric capacity of the motor bearing lubricant, then the voltage discharges in a short pulse to ground through the bearing. After discharge, the voltage again accumulates on the shaft and the cycle repeats itself. This random and frequent discharging has an electric discharge machining (EDM) effect, causing pitting of the bearing's rolling elements and raceways. Initially, these discharges create a "frosted" or "sandblasted" effect. Over time, this deterioration causes a groove pattern in the bearing race called "fluting" which is a sign that the bearing has sustained severe damage. Eventually, the deterioration will lead to complete bearing failure.[3]

See www.Greenheck.com

The prior art teaches numerous methods of handling shaft voltages including using a shielded cable, grounding the shaft, insulated bearings and installation of a Faraday shield. For example, see published U.S. Patent Applications 2004/0233592 and 2004/0185215 filed by Oh et al., which are incorporated herein by reference. Most external applications add to costs, complexity and exposure to external environmental factors. Insulated bearings provide an internal solution by eliminating the path to ground through the bearing for current to flow. But, installing insulated bearings does not eliminate the shaft voltage, which will still find the lowest impedance path to ground. Thus, insulated bearings are not effective if the impedance path is through the driven load. Therefore, the prior art does not teach an internal, low wearing method or apparatus to efficaciously ground shaft voltage and avoid electric discharge machining of bearings leading to premature bearing failure.

SUMMARY OF THE INVENTION

An objective of the present invention is to provide an improvement to seals or bearing isolators to prevent leakage of lubricant and entry of contaminants by encompassing the stator within the rotor to create an axial directed interface at the radial extremity of the rotor. It is also an objective of the present invention to disclose and claim a seal or bearing isolator for rotating equipment that retains lubricants, prevents contamination and conducts and transmits and directs bearing current to ground.

Prior art seals traditionally had the interface between the rotor and the stator exposed radially to the contaminants or lubricants at the radial extremity of the seal. The projection of an axial portion of the stator into the rotor has been expanded radially. This projection or protruding member of the stator into the rotor has been expanded radially beyond the diameter of the major portion or body of the stator.

The rotor and the recess rotor, which previously surrounded the stator projection or insertion, is also extended radially beyond the major portion of the stator. The rotor now encompasses the stator, or a substantial portion of the stator radial projection, in such a manner that the interface presented to the ingress of the lubricant or contaminates is facing axially and rearwardly. The axial facing interface presents limited access to the internal of the seal and a constant dimensional interface between the rotor and the stator regardless of any axial movement of the rotor with respect to the stator.

A groove may be machined into the stator to accentuate the novel radial extension of the rotor and the stator. This groove improves the ability of the seal to prevent contaminants from entering the axial interface gap between the rotor and the stator. This novel improvement, i.e., the encapsulation of the radial extension stator by the rotor, enables the interface gap between the accessible portions of the stator and the rotor to be of a predetermined dimension. The improvement also means that there is no fluctuation or variation in the interface gap resulting from any relative axial movement between the rotor and the stator.

This novel seal or bearing isolator will operate to vastly improve the rejection or ingress of contaminants into the interface gap between the rotor and stator. The entrance to the interface gap is facing or directed away from the normal flow of contaminants, i.e., along the axis of the shaft toward the housing. The interface gap can be machined to extremely close tolerances because there is no movement radially between the rotor and the stator and any axial movement does not affect the interface.

The increased rejection of contaminants also provides an opportunity to reduce shaft voltage and attendant bearing wear caused by electrostatic discharge machining. Placement of a receptor groove in the stator of the above described shaft seal assembly allows insertion of a conductive insert. This insert can be a metallic or non-metallic solid, machined or molded. The insert can also be a metallic ring having conductive filament brushes affixed therein. Although any type of metal compatible with operating conditions and metallurgy may be selected, bronze or aluminum are believed to be preferred metals because of increased conductivity, strength, corrosion and wear resistance. Combining the receptor groove and conduction means with the benefits of the improved bearing isolator reduces the environmental exposure of the conduction means.

It has been found that a bearing isolator assembly having a rotor and stator manufactured from bronze has improved charge dissipation qualities. The preferred bronze metallurgy is that meeting specification 932 (also referred to as 932000 or "bearing bronze"). This bronze is preferred for bearings and bearing isolators because it has excellent load capacity and antifriction qualities. This bearing bronze alloy also has good machining characteristics and resists many chemicals. It is believed that the specified bronze offers increased shaft voltage collection properties comparable to the ubiquitous lighting rod due to the relatively low electrical resistivity (85.9 ohms-cmil/ft @ 68 F or 14.29 microhm-cm @ 20 C.) and high electrical conductivity (12% IACS @ 68 F or 0.07 MegaSiemens/cm @ 20 C.) of the material selected.

This embodiment improves upon shaft brushes typically mounted external of the motor housing. Previous tests of a combination shaft seal assembly with a concentric inserted conductive brush engaged with the shaft have shown substantial reduction in shaft voltage and attendant electrostatic discharge machining. Direct seating between the conduction ring means and the bearing isolator portion of the motor ground seal improves the conduction to ground over a simple housing in combination with a conduction means as taught by the prior art. Those practiced in the arts will understand that this improvement requires the electric motor base to be grounded, as is the norm.

It is therefore an objective of the present invention to disclose and claim an electric motor for rotating equipment having bearing isolator means that retains lubricants, prevents contamination and conducts and transmits and directs bearing current to ground.

It is another objective of the present invention to disclose and claim a bearing isolator for rotating equipment that retains lubricants, prevents contamination and conducts electrostatic discharge (shaft voltage) to improve bearing operating life.

It is another objective of the present invention to disclose and claim a bearing isolator for rotating equipment that retains lubricants, prevents contamination and provides adequate grounding.

It is another objective of the present invention to disclose and claim a bearing isolator for rotating equipment that retains lubricants, prevents contamination and provides a low impedance ground path for the voltage to flow to earth ground without passing through the motor bearings or other components.

Other objects, advantages and embodiments of the invention will become apparent upon the reading the following detailed description and upon reference to drawings.

DETAILED DESCRIPTION—ELEMENT LISTING

Figure 1:
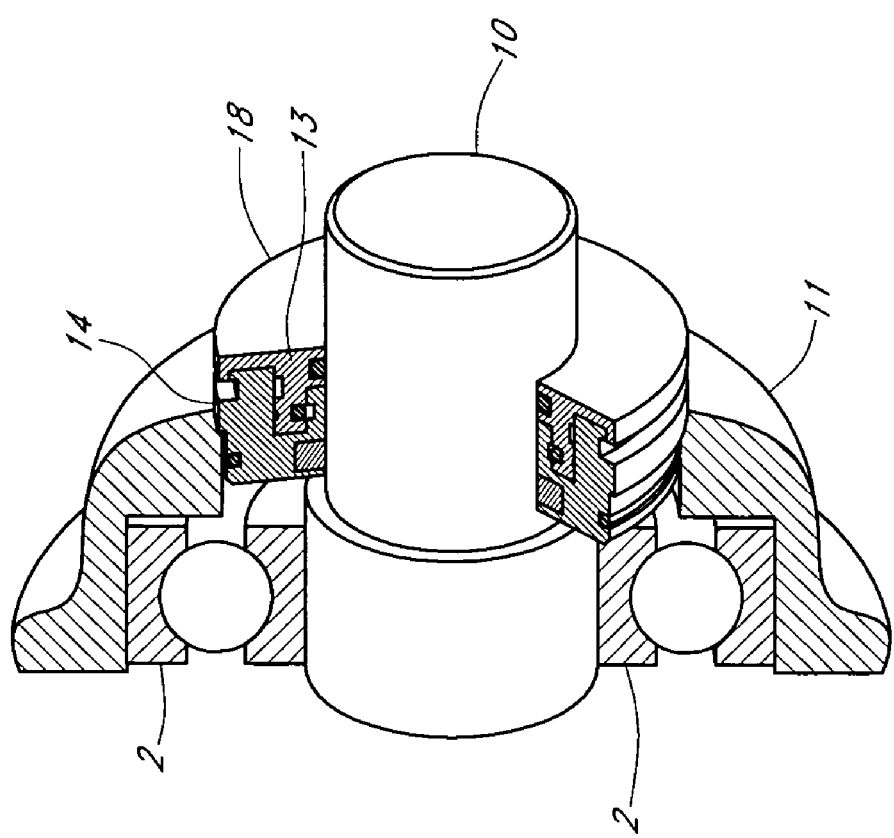
FIG. 1 is a perspective exterior view of motor ground seal assembly mounted to a motor housing.

| Description | Element No. |
| --- | --- |
| Drive bearing | 2 |
| Conductive brushes | 3 |
| Receptor groove | 4 |
| Brush ring | 5 |
| Metallic insert with solid conductor ring | 6 |
| Conductive insert ring | 7 |
| First O-ring | 8 |
| Solid conductive ring | 9 |
| Rotatable shaft | 10 |
| Housing | 11 |
| Rotatable shaft center | 12 |
| Rotor | 13 |
| Stator | 14 |
| Second O-ring | 15 |
| Brush ring frame | 16 |
| Third O-ring | 17 |
| Motor ground seal assembly | 18 |
| First axial interface gap | 20 |
| Second axial interface gap | 22 |

-continued

| Description | Element No. |
|---|---|
| Third axial interface gap | 24 |
| Fourth axial interface gap | 26 |
| First radial interface gap | 30 |
| Second radial interface gap | 32 |
| Third radial interface gap | 34 |
| Stator main body | 40 |
| Stator axial projection | 42 |
| Stator radial projection | 44 |
| Stator exterior groove | 45 |
| Stator first O-ring groove | 46 |
| Interior annular groove | 48 |
| Rotor main body | 50 |
| Rotor axial projection | 52 |
| Rotor radial projection | 54 |
| Rotor first O-ring groove | 56 |
| Labyrinth passage | 60 |

Before the various embodiments of the present invention are explained in detail, it is to be understood that the invention is not limited in its application to the details of construction and the arrangements of components set forth in the following description or illustrated in the drawings. The invention is capable of other embodiments and of being practiced or of being carried out in various ways. Also, it is to be understood that phraseology and terminology used herein with reference to device or element orientation (such as, for example, terms like "front", "back", "up", "down", "top", "bottom", and the like) are only used to simplify description of the present invention, and do not alone indicate or imply that the device or element referred to must have a particular orientation. In addition, terms such as "first", "second", and "third" are used herein and in the appended claims for purposes of description and are not intended to indicate or imply relative importance or significance.

DETAILED DESCRIPTION

FIG. 1 illustrates a perspective view of the present invention applied to a rotatable shaft 10 of an electrical motor controller having a variable frequency drive (VFD). (Motor not shown) The motor ground seal™ assembly 18 shown in FIG. 1 may be mounted to rotatable shaft 10 on either one or both sides of the housing 11. As depicted herein, the housing 11 may be a pump housing, compressor housing, motor housing, or any other housing 11 that may be employed with rotating equipment of any type. The motor ground seal™ assembly 18 may be flange-mounted or press-fit or attached by other means to a housing 11. The present invention will also function with a rotating housing and stationary shaft. (Not shown)

As shown in FIGS. 2-6, the rotor 13 faces outboard and is engaged with an inboard facing stator 14. The receptor groove 4 allows placement of one of the following conduction means with the motor ground seal assembly 18: a solid conductive ring having conductive filament brushes 3 attached therein, a solid conductive ring having conductive filament brushes 3 attached therein and a metallic annular frame surrounding the conductive ring, a metallic insert with solid conductor ring 6, or a conductive insert ring 7. The receptor groove 4 as shown can also be utilized on other shaft seal assemblies and bearing isolators or combinations therein which use only labyrinths.

As shown in FIGS. 2-6, the location of the gap with respect to the rotor 13 and stator 14 surfaces and the direction of the opening interface gaps 20 and 21 are both important elements of one embodiment of the motor ground seal assembly 18.

The rotor 13 extends radially well beyond the major diameter of the stator 14. This permits the rotor 13 to encompass the stator radial projection 44. It is important that the rotor radial projection 54 extends beyond the basic radial dimension of stator 14. See U.S. Pat. No. 6,419,233 issued to Orlowski and incorporated by reference herein. This requires a departure from the prior art wherein the rotor 13 was radially co-extensive with the major diameter of the stator 14.

As shown in FIGS. 2-6, the stator 14 and rotor 13 may be configured to create a labyrinth passage 60 from the exterior of the housing 11 (generally depicted toward the right in FIGS. 2-6) and the interior of the housing 11 (generally depicted toward the left in FIGS. 2-6) through the motor ground seal assembly 18. The rotor 13 is generally affixed to the rotatable shaft 11 (and rotatable therewith) using a second O-ring 15, but may be affixed thereto using other structures, such as set screws, keys with corresponding grooves, or any other means known to those skilled in the art. In the exemplary embodiment, the labyrinth passage 60 includes (in order from the exterior of the housing 11 to the interior thereof) a first axial interface gap 20, a first radial interface gap 30, a second axial interface gap 22, an interior annular groove 48, a third axial interface gap 24, a second radial interface gap 32, a fourth axial interface gap 26, a first O-ring 8, and a third radial interface gap 34. The first O-ring 8 may be a unitizing ring, as is well known to those skilled in the art, which helps to isolate the third radial interface gap 34 from the fourth axial interface gap 26. In the exemplary embodiment, the first O-ring 8 is positioned partially in a stator first O-ring groove 46 and a rotor first O-ring groove 56. In other embodiments not pictured herein, no first O-ring 8 is used in the motor ground seal assembly 18.

The stator 14 and rotor 13 each include a stator main body 40 and a rotor main body 50, respectively. The stator main body 40 is generally the portion of the stator 14 that abuts the housing 11. The rotor main body 50 is generally the portion of the rotor 13 that abuts the rotatable shaft 10. In the exemplary embodiment, a stator axial projection 42 and a stator radial projection 44 protrude from the stator main body 40, and a rotor axial projection 52 and rotor radial projection 54 protrude from the rotor main body 50. As shown in FIGS. 2-6, these projections 42, 44, 52, 54 cooperate with the geometry of the stator 14 and rotor 13 to form the various interface gaps 20, 22, 24, 26, 30, 32, 34, which in turn form the labyrinth passage 60. More or fewer projections 42, 44, 52, 54 from the stator main body 40 and/or rotor main body 50 may be employed in embodiments not pictured herein without departing from the spirit and scope of the present invention.

The first axial interface gap 20 between the rotor 13 and stator 14 that is exposed to the contamination or lubricants is now fixed in dimension and independent of any relative axial movement between the rotor 13 and the stator 14. The first radial interface gap 30 is still subject to variation in dimension by any relative axial movement between the rotor 13 and the stator 14. This relative movement is not significant to the operation in as much as only a small amount of contaminants have been able to enter the labyrinth passage 60 because of the size and location of the first radial interface gap 30. The removal of the first axial interface gap 20 from variations is more important in seals where the rotor 13 and the stator 14 are not restrained from relative movement.

The orientation of the opening of the first axial interface gap 20 is important regardless of relative movement between the stator 14 and rotor 13. The axial orientation of the first axial interface gap 20 controls entrance of contaminants. Reduction or elimination of contaminants improves both the life and performance of the conductive means. The opening of the first axial interface gap 20 is now facing rearwardly toward the housing 11 and away from the contaminant stream. The contaminant or cooling stream, if present, will normally be directed along the axis of the shaft 10 and toward the housing 11.

A stator exterior groove 45 may be cut in the stator 14. This stator exterior groove 45 enhances and accentuates the benefits of the rotor radial and axial projections 54,52 and the stator radial and axial projections 44, 42 with the resultant orientation and independence of the first axial and first radial interface gaps 20, 30. The motor ground seal assembly may be made from any machinable metal such as stainless steel or having low resistivity including bronze, aluminum, copper, gold and combinations thereof.

The precise number of projections in either the axial or radial direction of either the stator 14 or rotor 13 may vary depending on the specific embodiment of the motor ground seal assembly 18, and therefore the number and orientation of the specific interfaces between the stator 14 and rotor 13 may also vary depending on the specific embodiment. Accordingly, the specific orientation, angles, and/or number of interfaces between the stator 14 and rotor 13 may vary in an infinite number of ways without departing from the spirit and scope of the present invention. Furthermore, the presence or absence of the interior annular groove 48 or dimensions thereof in no way limit the scope of the motor ground seal assembly 18.

As is well known to those skilled in the art, in other embodiments not pictured herein the motor ground seal assembly 18 may be configured with a drain (not shown) to allow for the removal of contaminants from the labyrinth 50. In a similar embodiment not pictured herein, such a drain (not shown) may be used to provide a passage for injected coolant to exit the motor ground seal assembly 18, as is apparent to those skilled in the art in light of the present disclosure. Furthermore, in still other embodiments, the motor ground seal assembly 18 could be configured to return lubricant captured in the labyrinth 50 to a lubricant sump (not shown).

Figure 2:
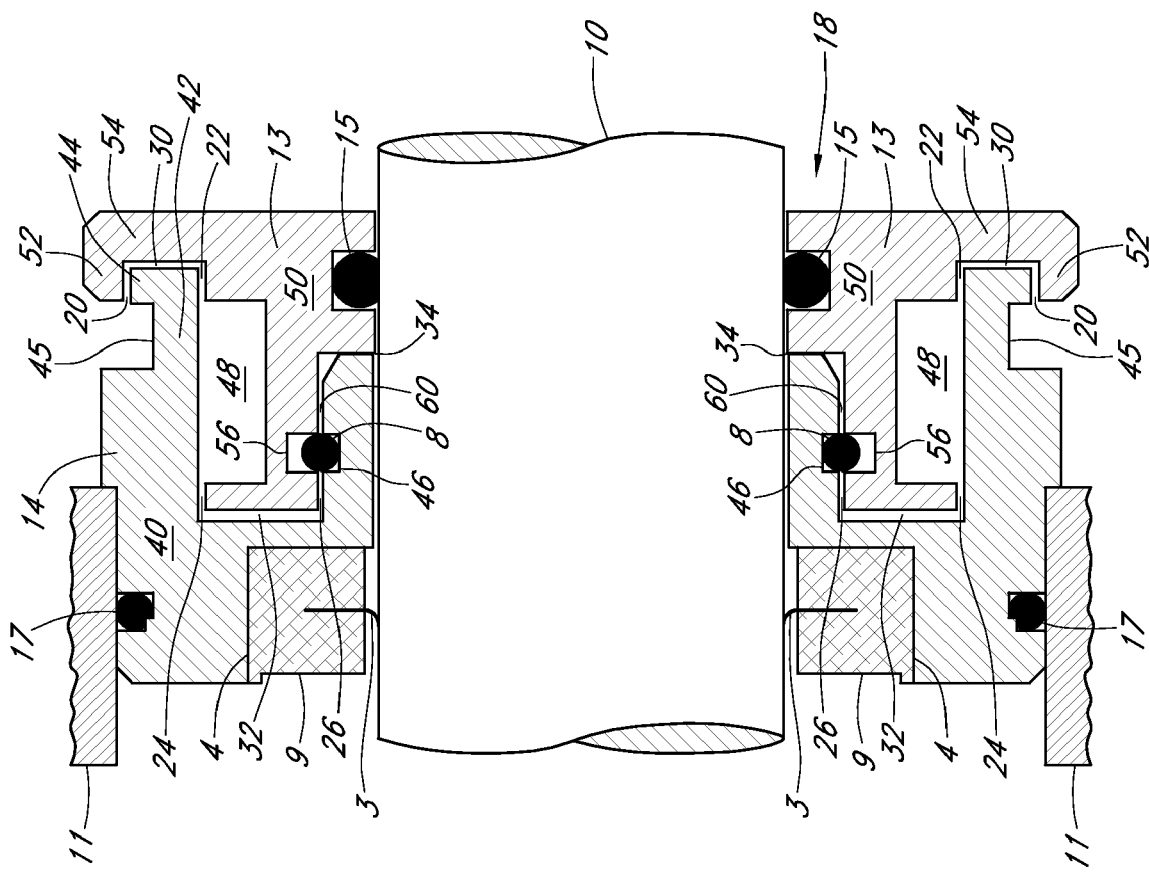
FIG. 2 is a sectional view of the present invention as shown in FIG. 1.

A receptor groove 4 may be cut into the stator 14 on the inboard side facing away from the rotor 13 and into the housing 11. This receptor groove 4 allows insertion of a circumferential ring-like structure within the stator 14. The embodiment illustrated in FIG. 2 shows a solid conductive ring 9 having conductive filaments or brushes 3 in contact with said shaft 10. The concentric solid conduction ring 9 may be flange-mounted, press-fit or attached by other means to and or within receptor groove 4.

Figure 3:
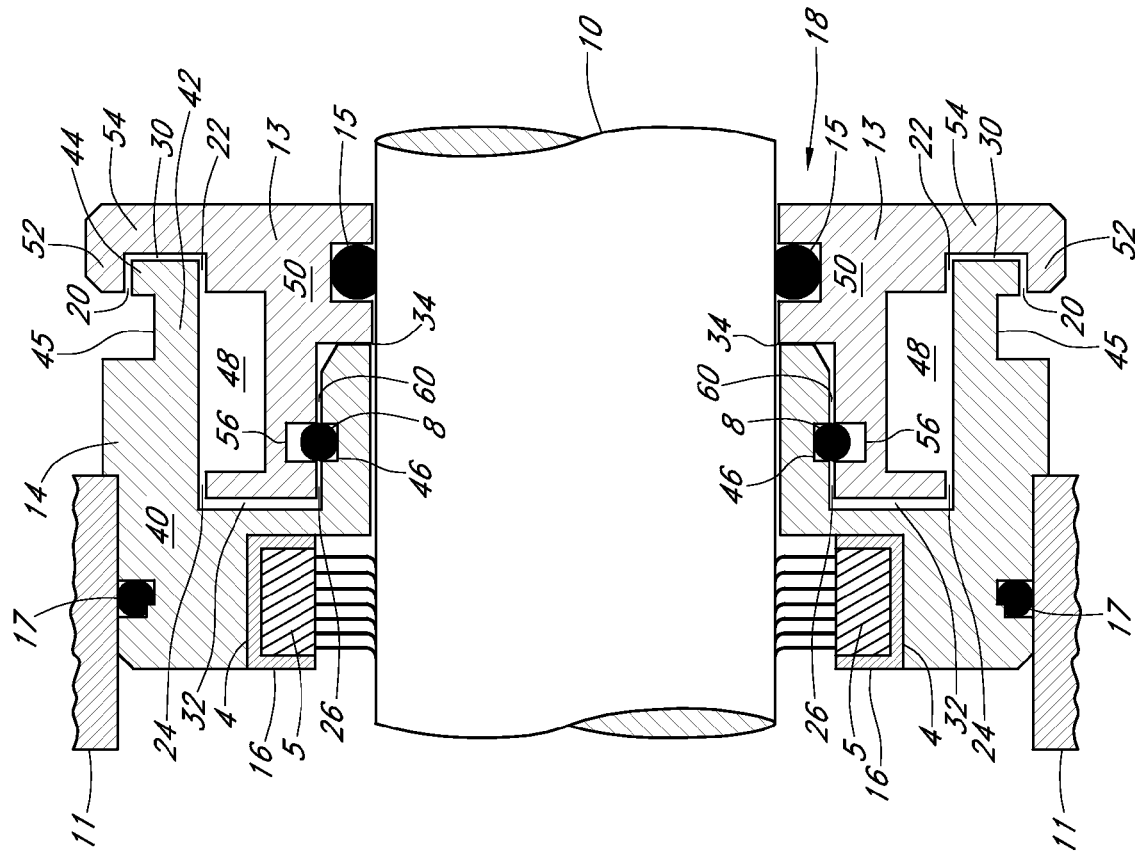
FIG. 3 is a sectional view of another embodiment of the present invention as shown in FIG. 2 wherein a conduction ring is shown with a plurality of conductive brushes.

FIG. 3 describes another embodiment of the present invention wherein the conductive insert is a brush ring 5 having a metallic base or frame 16, preferably made from a low resistivity material such as bronze, copper, gold or aluminum, having a plurality of fibrous conductive brushes 3 engaged with rotatable shaft 10 for transmission of bearing currents to ground. In this embodiment, the circumference of the brush ring 5 is force-fitted into the receptor groove 4 in the motor ground seal assembly 18, by means of a slightly tapered bore in said receptor groove 4 (not shown) to accommodate imperfections and dimensional tolerance of the brush ring 5 surrounding the filament brushes 3. In the preferred embodiment, the brush ring 5 would be as described in published U.S. Patent Applications 2004/0233592 and 2004/0185215 filed by Oh et al. The brush ring 5 incorporates technology sold as an "AEGIS SGRTM Conductive MicroFiber™ brush" by Electro Static Technology—an Illinois Tool Works Company.

The motor ground seal assembly 18 improves conduction and reduces the effects of "bearing current" by enhancing and increasing the rigidity of circumferential brush ring 5, thereby increasing the resistance to deformation of the brush ring frame 16 during operation. Deformation of the brush ring 5 and frame 16 during operation is a problem because it destabilizes the spatial relationship between the tip of the brushes, or the shaft facing surfaces of other conductive means, and the rotating shaft 10. The resulting change in spatial relationship, which although small and within normal machine operating tolerances, negatively affects the conduction of the electrostatic discharge (shaft voltage) from the rotating shaft to ground, thus resulting in the decreased performance of prior art grounding devices.

The performance of the motor ground seal assembly 18 disclosed and claimed herein is further improved by aggressive interference between the conduction means and receptor groove 4 of the motor ground seal assembly 18. The outside diameter of the brush ring 5 means may be up to 0.004 inches (0.102 mm) greater than the inside diameter of the receptor groove 4. The performance of the motor ground seal assembly 18 is further improved by aggressive interference between the motor grounding seal assembly 18 and the housing 11 of the motor. The outside diameter of the stator may be up to 0.004 inches (0.102 mm) greater than the inside diameter of the motor housing 11.

Figure 4:
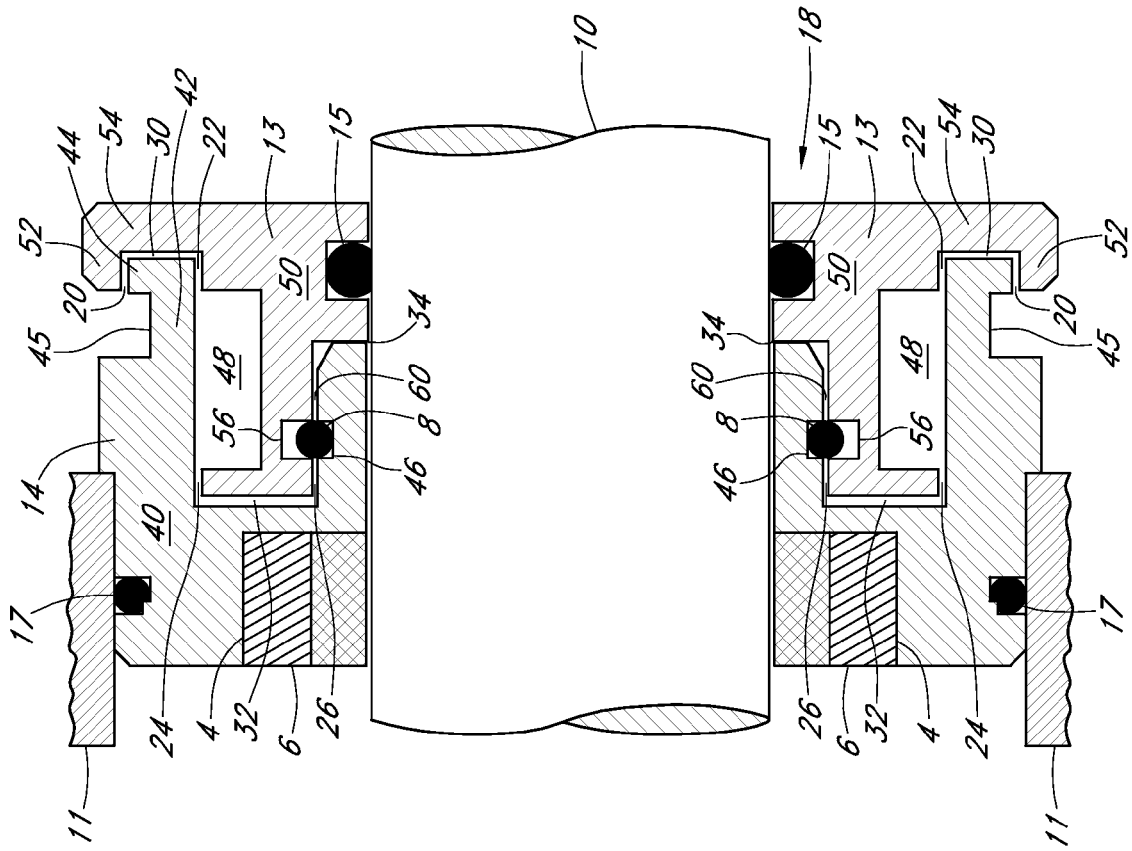
FIG. 4 is a sectional view of another embodiment of the present invention wherein a metallic conduction ring is shown with an insert having conductive properties.

FIG. 4 describes another embodiment of the present invention wherein the metallic insert with solid conductor ring 6 has a metallic base, preferably a low resistivity material such as bronze, copper, gold or aluminum, and forms a circumferential conductive ring around the rotating shaft when inserted into the receptor groove 4 of the stator 14 for engagement with rotatable shaft 10 for transmission of bearing currents to ground. (Not shown)

Figure 5:
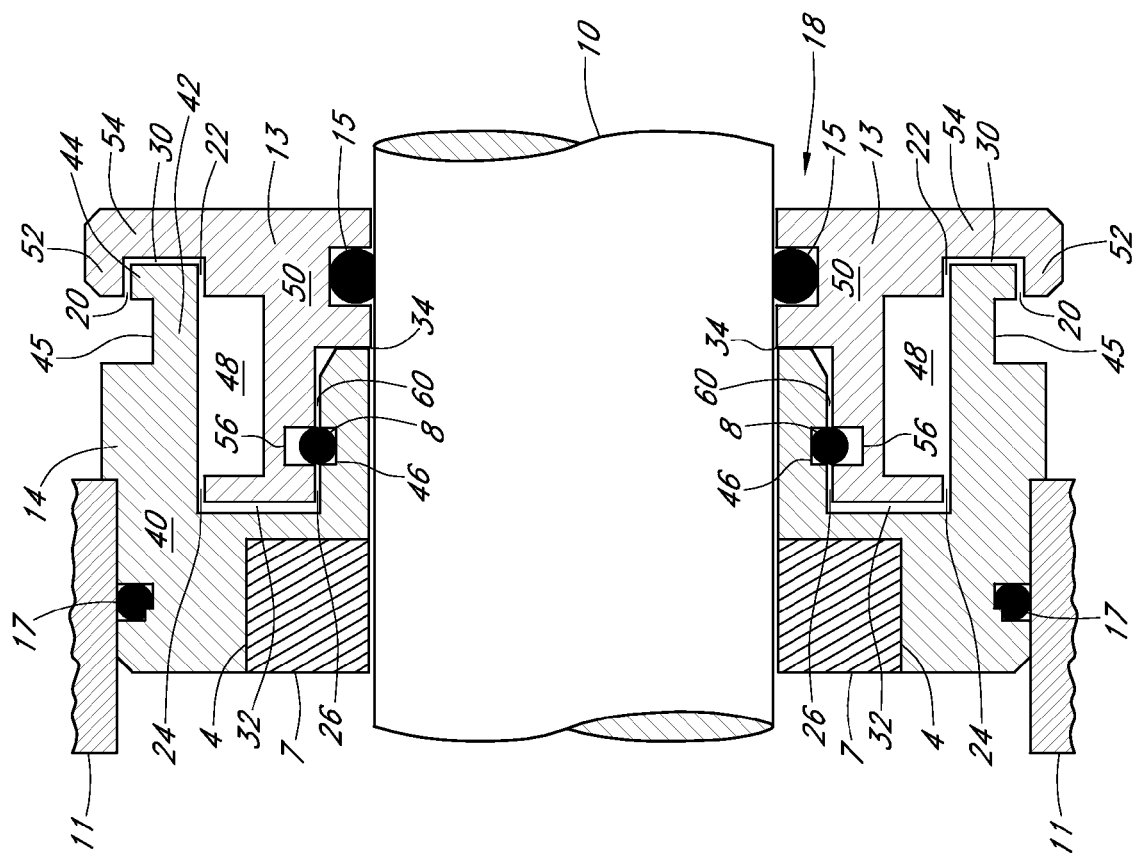
FIG. 5 is a sectional view of another embodiment as shown in FIG. 2 wherein the conductive ring is solid.

FIG. 5 describes another embodiment of the present invention wherein the conductive insert ring 7 is a concentric circumferential ring affixed within the receptor groove 4 of said stator 14 therein for engagement with shaft 10 for transmission of bearing currents to ground. (Not shown). Reduction of deformity aggressive interference between conduction means/receptor groove 4 and motor ground seal 18/housing 11 rotating is contemplated for the embodiments shown and described at FIGS. 4 and 5.

Figure 6:
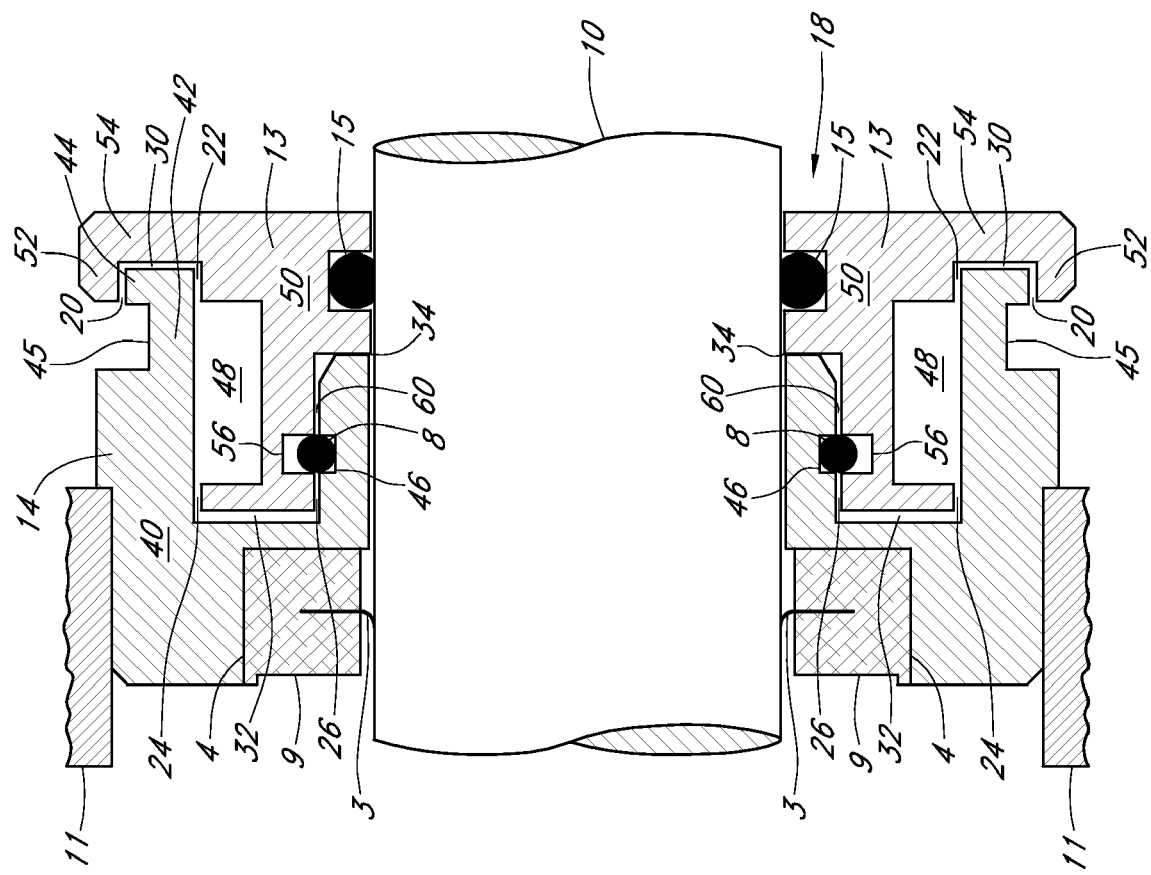
FIG. 6 is another embodiment of the present invention as shown in FIG. 2.

The motor ground seal assembly 18 may be used with a third o-ring 17 between stator 14 and motor housing 11 as shown in preceding FIGS. 1-5. Performance of the motor ground seal assembly 18, however, may be further improved by eliminating third o-ring 17 and its companion groove as shown in FIG. 6. The non-conductive nature of third o-ring 17 may impede conductivity between the motor grounding seal assembly 18 and housing 11 thereby decreasing the overall charge dissipation performance of the motor ground seal assembly 18.

Figure 7:
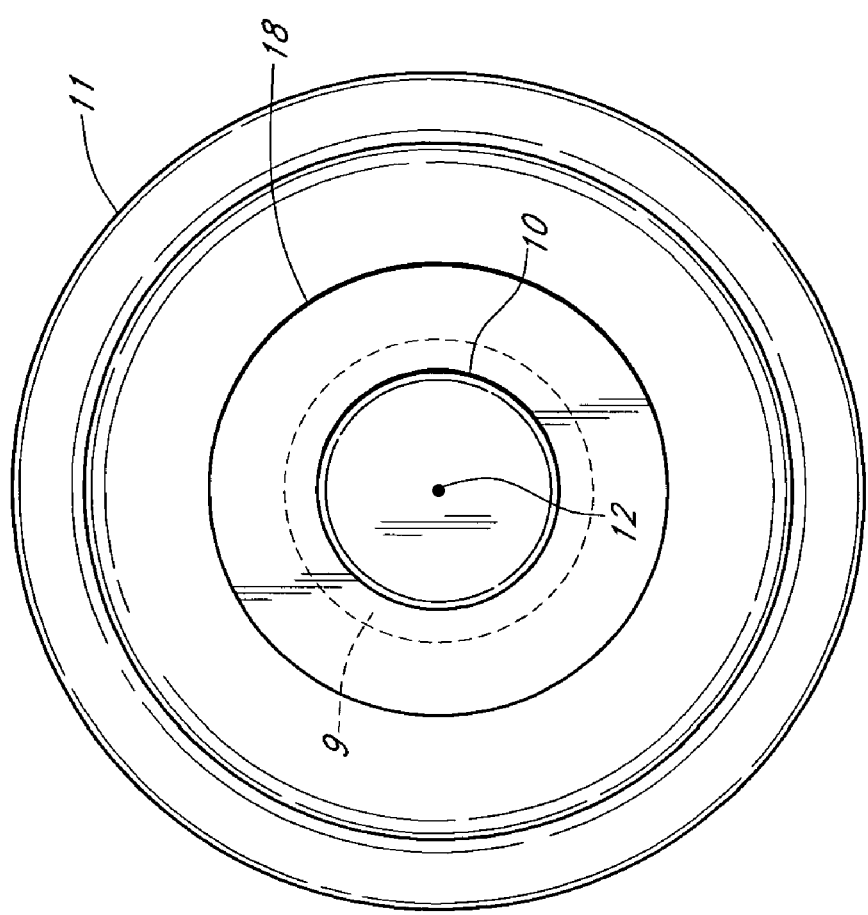
FIG. 7 is a side view of the present invention illustrating the concentric nature of the invention.

As shown in FIG. 7, the motor ground seal assembly 18 in combination with the motor housing 11 creates a stable concentric system with the rotating shaft as its center point 12. Inserting the combination of conductive brushes 3, brush rings 5 or conductive inserts (6, 7 or 9) into the motor ground seal assembly 18 within the motor housing 10, and press or force fitting the various conducting elements (conduction means, stator 14 and housing 11) together, forms a relatively fixed and stable spatial relationship between the conducting elements, thereby improving the collection and conduction of electrostatic discharge (shaft voltage) from the rotating shaft 10 to ground, through the conducting elements of the motor ground seal assembly 18. This improved motor ground sealing system directly seats major elements together which compensates for motor shafts, which are not necessarily perfectly round, and ensures the variation or change in distance from the brush tips 3 to the shaft 10 surface caused by external forces acting on the motor ground sealing system are minimal, thus promoting effective ionization of the air surrounding the brushes 3 and conduction of shaft voltage.

Figure 8:
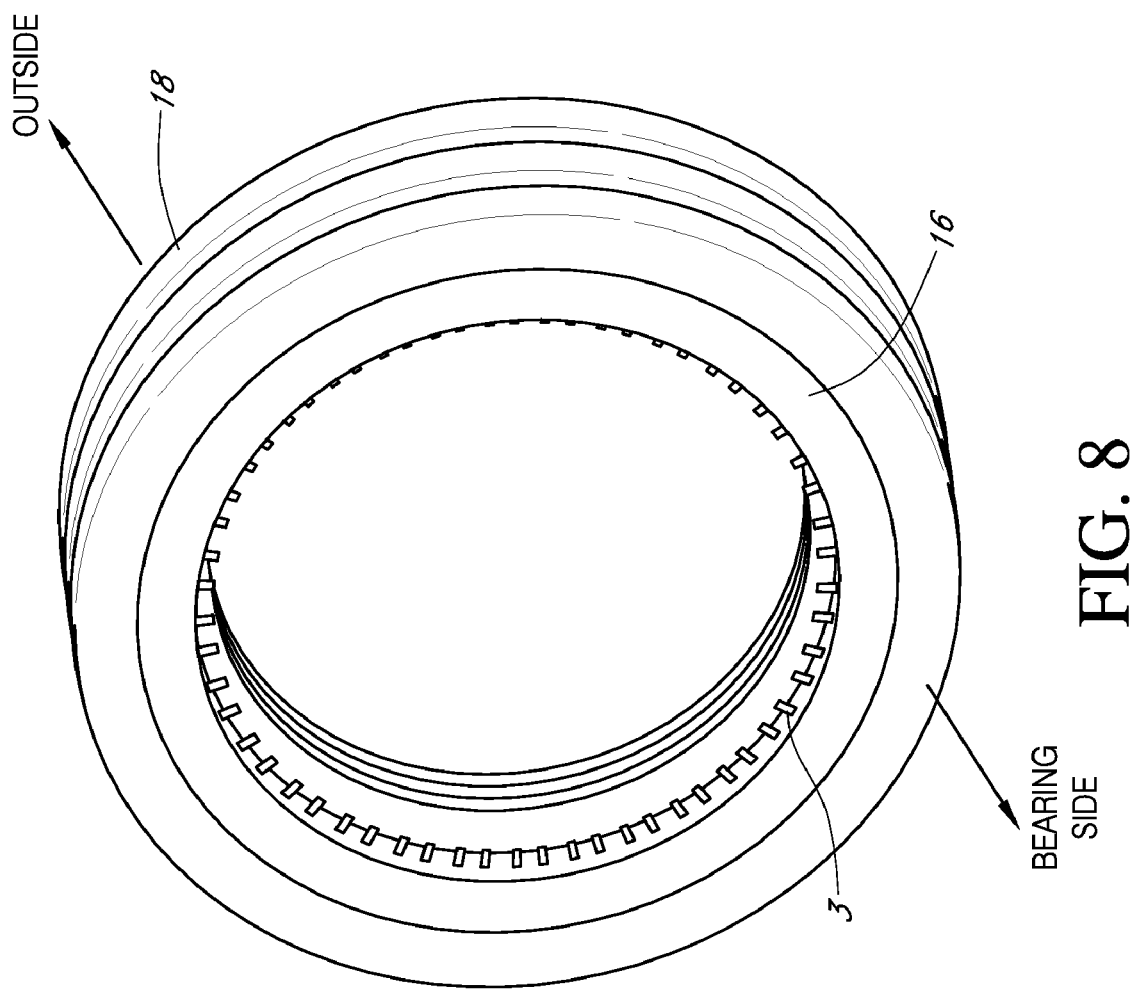
FIG. 8 is a perspective view of the motor ground seal assembly.

FIG. 8 is a perspective view of a circumferential filament brush ring 5 having an annular brush ring frame 16. The brush ring 5 includes a brush ring frame 16 configured with an annular channel having a plurality of electrically conductive filament brushes 3 positioned therein. The conductive filament brushes 3 are sufficiently small to induce ionization in the presence of an electrical field. The conductive filament brushes 3 are retained by the brush ring frame 16 and have distal end portions disposed in the annular channel formed therein. As shown, the circumference of the brush ring 5 was force-fitted into the receptor groove 4 in the motor ground seal assembly 18.

Having described the preferred embodiment, other features of the present invention will undoubtedly occur to those versed in the art, as will numerous modifications and alterations in the embodiments of the invention illustrated, all of which may be achieved without departing from the spirit and scope of the invention.

The invention claimed is:

1. A labyrinth type seal for sealing a rotatable shaft entering a grounded housing comprising:
   a. a grounded housing;
   b. a stator surrounding a shaft and affixed to said housing, said stator having a main body and at least one axial projection and at least one radial projection, wherein said at least one axial projection and at least one radial projection both extend beyond said stator main body;
   c. a rotor surrounding said shaft and rotatively connected to said shaft, said rotor having a main body and at least one axial projection and at least one radial projection, wherein said at least one axial projection and said at least one radial projection both extend from said rotor main body;
   d. a circular circumferential receptor groove formed in said stator and facing said shaft;
   e. a circumferential brush ring having an annular frame, said frame including:
      i. first and second frame members defining an annular channel;
      ii. a plurality of electrically conductive brushes electrically connected to said annular frame, said conductive brushes being sufficiently small to induce ionization in the presence of an electrical field, said conductive brushes being retained between said first and second frame members and having distal end portions disposed in said annular channel;
   f. wherein electrical charges produced through ionization are collected for conduction through said conductive brushes to and through said annular frame, to and through said stator and to said grounded housing, away from said shaft;
   g. wherein said rotor and said stator are abutted and intermeshed with each other on said shaft, said at least one rotor radial projection extending radially outwardly farther than said at least one stator radial projection.
   h. wherein said radial space between said at least one rotor axial projection and said at least one stator radial projection form a first axial interface gap, wherein said first axial interface gap includes an opening to a space in said stator and facing said stator main body between said housing and said at least one stator radial projection and said at least one rotor radial projection, wherein the dimension of said first axial interface gap is predetermined and constant;
   i. wherein said opening of said first axial interface gap faces away from said at least one rotor axial projection, said at least one rotor radial projection, and towards said housing;
   j. wherein said stator main body surrounds a portion of said rotor;
   k. wherein the radius of the radial internal surface of said at least one rotor radial projection encompassing a portion of said stator is greater than the radius of the exterior surface of said at least one stator radial projection;
   l. wherein said stator main body and said rotor main body cooperate to form at least one labyrinth passage;
   m. wherein said stator and said rotor are restrained from relative axial movement between each other;
   n. wherein a stator exterior groove is formed in said stator main body, wherein said stator exterior groove augments said at least one stator radial projection;
   o. wherein said receptor groove has a tapered bore allowing said circumferential brush ring, having an outer diameter slightly greater than the inside diameter of said receptor groove, thereby force fitting said circumferential brush ring into said receptor groove;
   p. wherein the difference between said receptor groove inside diameter and said circumferential brush ring does not exceed 0.005 inches (0.127 mm);
   q. wherein said stator to be inserted in and affixed to said housing has an outside diameter, said stator outside diameter is slightly greater than the inside diameter of said housing, thereby requiring a force fit between said stator and said housing: and
   r. wherein said stator and rotor are comprised of a low resistivity material selected from the group consisting of aluminum, bronze, copper, gold and combinations thereof.

2. A labyrinth type seal for sealing a rotatable shaft entering a grounded housing comprising:
   h. a grounded housing;
   i. a stator surrounding a shaft and affixed to said housing, said stator having a main body and at least one axial projection and at least one radial projection, wherein said at least one axial projection and at least one radial projection both extend beyond said stator main body;
   j. a rotor surrounding said shaft and rotatively connected to said shaft, said rotor having a main body and at least one axial projection and at least one radial projection, wherein said at least one axial projection and said at least one radial projection both extend from said rotor main body;
   k. a circular circumferential receptor groove formed in said stator and facing said shaft;
   l. a circumferential brush ring having an annular frame, said frame including:
      i. first and second frame members defining an annular channel;
      ii. a plurality of electrically conductive brushes electrically connected to said annular frame, said conductive brushes being sufficiently small to induce ionization in the presence of an electrical field, said conductive brushes being retained between said first and second frame members and having distal end portions disposed in said annular channel;
   m. wherein electrical charges produced through ionization are collected for conduction through said conductive brushes to and through said annular frame, to and through said stator and to said grounded housing, away from said shaft;

n. wherein said rotor and said stator are abutted and intermeshed with each other on said shaft, said at least one rotor radial projection extending radially outwardly farther than said at least one stator radial projection.

o. wherein said radial space between said at least one rotor axial projection and said at least one stator radial projection form a first axial interface gap, wherein said first axial interface gap includes an opening to a space in said stator and facing said stator main body between said housing and said at least one stator radial projection and said at least one rotor radial projection, wherein the dimension of said first axial interface gap is predetermined and constant;

p. wherein said opening of said first axial interface gap faces away from said at least one rotor axial projection, said at least one rotor radial projection, and towards said housing;

q. wherein said stator main body surrounds a portion of said rotor;

r. wherein the radius of the radial internal surface of said at least one rotor radial projection encompassing a portion of said stator is greater than the radius of the exterior surface of said at least one stator radial projection;

s. wherein said stator main body and said rotor main body cooperate to form at least one labyrinth passage;

t. wherein said stator and said rotor are restrained from relative axial movement between each other;

u. wherein a stator exterior groove is formed in said stator main body, wherein said stator exterior groove augments said at least one stator radial projection; and, v. wherein said receptor groove has a tapered bore allowing said circumferential brush ring, having an outer diameter slightly greater than the inside diameter of said receptor groove, thereby force fitting said circumferential brush ring into said receptor groove.

3. A seal in accordance with claim 2, wherein the difference between said receptor groove inside diameter and said circumferential brush ring does not exceed 0.005 inches (0.127 mm).

4. A seal assembly in accordance with claim 3 wherein said stator and rotor are comprised of a low resistivity material selected from the group consisting of aluminum, bronze, copper, gold and combinations thereof.

5. A seal in accordance with claim 2, wherein said stator to be inserted in and affixed to said housing has an outside diameter, said stator outside diameter is slightly greater than the inside diameter of said housing, thereby requiring a force fit between said stator and said housing.

6. A seal in accordance with claim 5, wherein the difference between said housing inside diameter and said stator outside diameter does not exceed 0.005 inches (0.127 mm).

7. A seal assembly in accordance with claim 6 wherein said stator and rotor are comprised of a low resistivity material selected from the group consisting of aluminum, bronze, copper, gold and combinations thereof.

8. A seal assembly in accordance with claim 5 wherein engagement of said seal assembly within and to said housing forms a concentric directly seated sealing system having said shaft at its center for enhanced transmission of shaft voltage away from said shaft.

9. A seal assembly in accordance with claim 8 wherein said stator and rotor are comprised of a low resistivity material selected from the group consisting of aluminum, bronze, copper, gold and combinations thereof.

10. A seal assembly in accordance with claim 5 wherein said stator and rotor are comprised of a low resistivity material selected from the group consisting of aluminum, bronze, copper, gold and combinations thereof.

11. A seal assembly in accordance with claim 2 wherein said stator and rotor are comprised of a low resistivity material selected from the group consisting of aluminum, bronze, copper, gold and combinations thereof.

* * * * *